May 16, 1944.　　　H. N. CHRISTENSON　　　2,349,142
DRILL JIG
Filed March 14, 1942　　　2 Sheets-Sheet 2
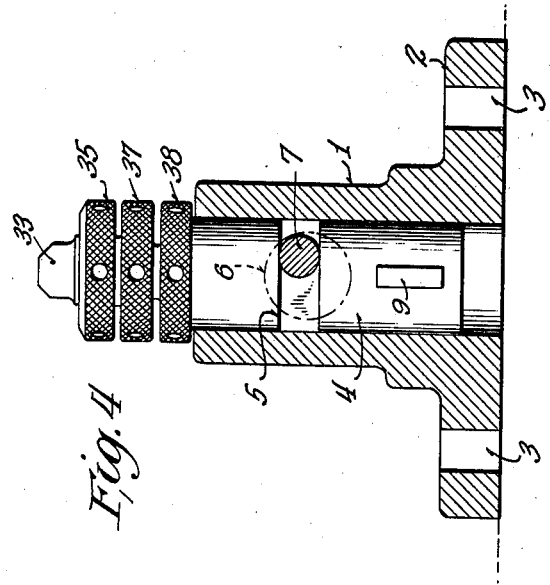
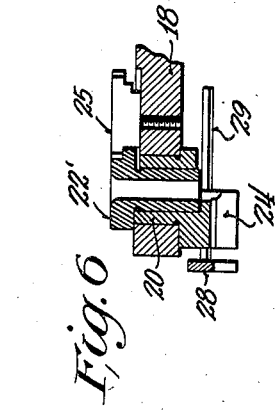
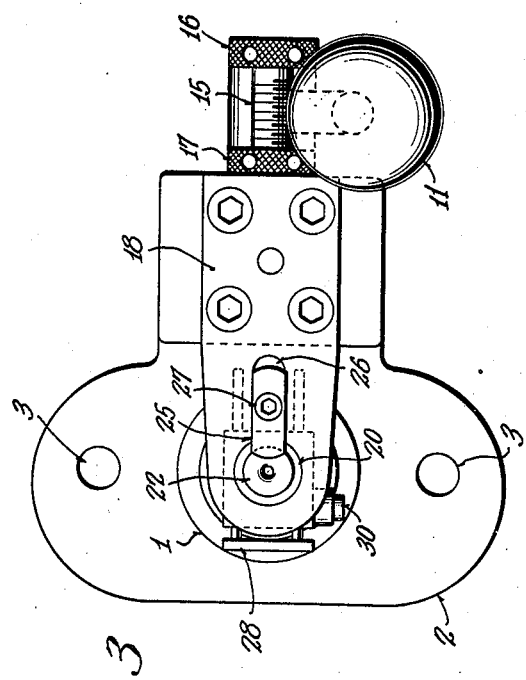
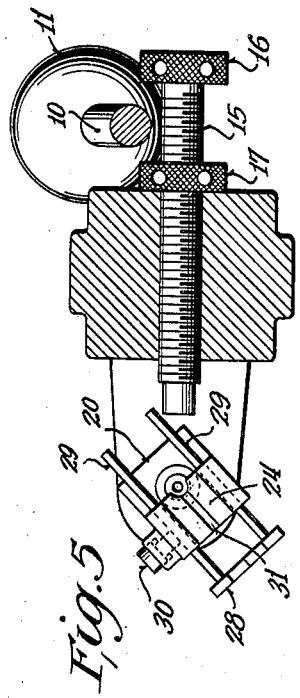
INVENTOR.
HARRY N. CHRISTENSON
BY
Arthur R. Woolfolk
ATTORNEY.

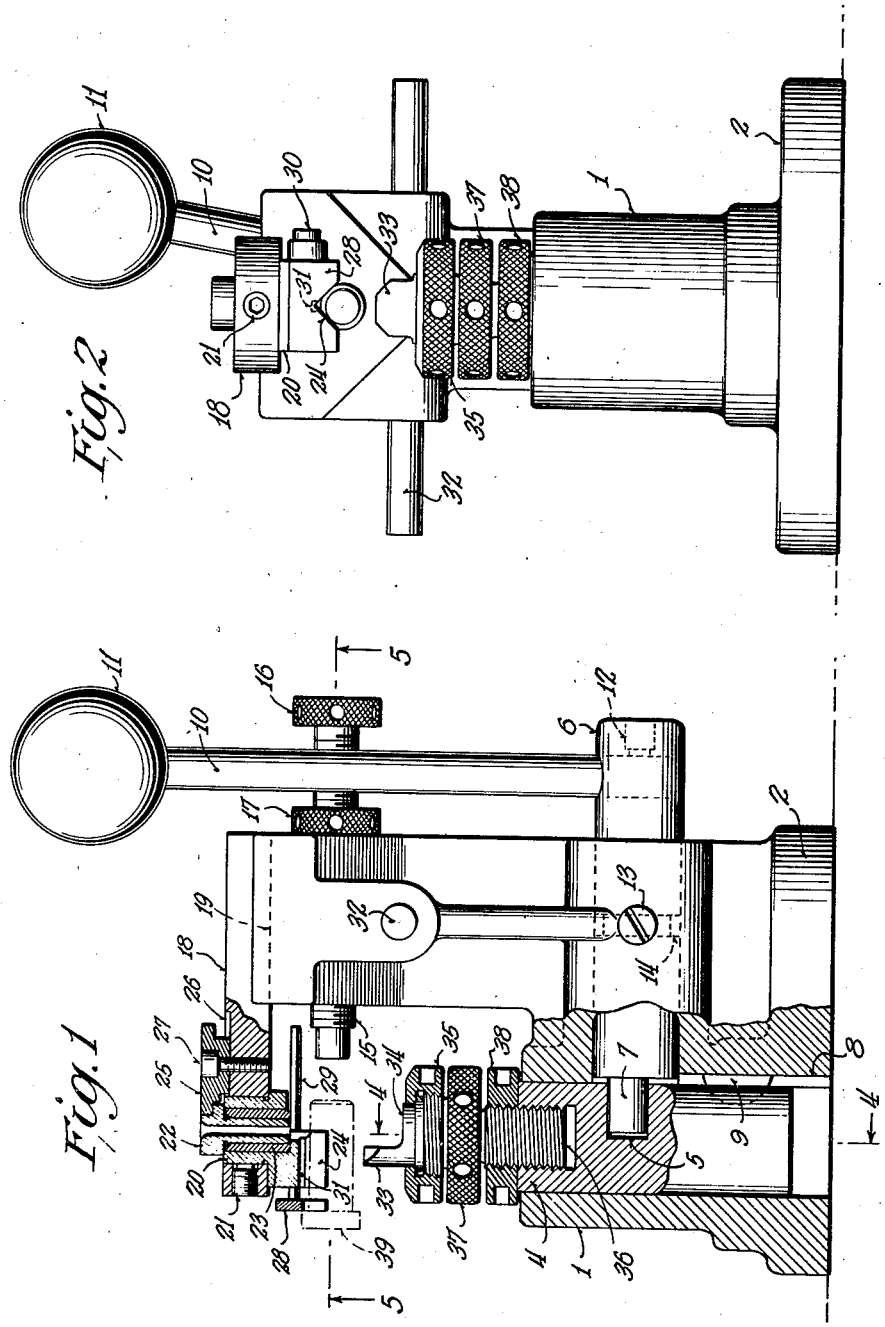

Patented May 16, 1944

2,349,142

UNITED STATES PATENT OFFICE 2,349,142

DRILL JIG

Harry Nels Christenson, Racine, Wis., assignor to Racine Screw Works, Racine, Wis., a corporation of Wisconsin Application March 14, 1942, Serial No. 434,699

4 Claims. (Cl. 77—62)

This invention relates to drill jigs.

In drill jigs of the type in which the work is clamped between positioning members, considerable difficulty has been experienced due to the fact that chips collect on the positioning members with the consequence that it is necessar to clean the positioning members off before each new piece of work is positioned. In addition to this, it is almost impossible to remove all of the small chips and consequently an error is finally made and the work is not accurately drilled as the work is frequently inadvertently positioned upon a minute chip and thus the correct positioning of the hole in the work is not obtained. This result occurs although considerable care is exercised in attempting to clean the work positioning members. Even if the utmost care is used a considerable time is lost due to this attempt to clean the work positioning members.

This invention is designed to overcome the above noted defects, and objects of this invention are to provide a novel form of drill jig which is so constructed that the chips will not accumulate on the positioning members, particularly the positioning member which determines the correct position of the drilled hole.

Further objects are to provide a drill jig which has means for locking the work in a firmly gripped position so that the operator may have both of his hands free if desired, which is so constructed that the work may be rapidly positioned and positively clamped and may be quickly freed from the machine with the assurance that no collection of chips will disturb the accuracy of the drilling operation.

Further objects are to provide an adjustable drill jig which is so made that it may be adjusted so that the work may be fed directly into the jig or may be fed at an angle, in which means are provided for adjusting the position of the work engaging members and for adjusting the device for gripping work of different diameters or dimensions.

Further objects are to provide a construction in which an end stop may be provided so as to definitely determine the spacing between the drilled hole and the end of the work piece, or in which a stop may be provided for engaging a shoulder on the work to thereby definitely position the drilled hole with reference to the shouldered portion of the work.

Further objects are to provide a construction which permits the use of any desired number of different sized drills and to provide means whereby standard drill guiding bushings with or without liners may be employed, the device being so constructed that the bushing and the liner, if used, are both readily and securely locked in place.

Further objects are to provide a construction which is very compact, which is simple, which may be readily secured to or detached from a drill bed or any other suitable support, and which is economical to manufacture.

An embodiment of the invention is shown in the accompanying drawings, in which:

Figure 1 is a side elevation, partly in section, of the device.

Figure 2 is a front view of the device.

Figure 3 is a plan view of the device.

Figure 4 is a sectional view on the line 4—4 of Figure 1.

Figure 5 is a sectional view on the line 5—5 of Figure 1 showing certain of the parts in a different position of adjustment from that shown in Figure 1.

Figure 6 is a sectional view through the drill guide and the associated parts, such view differing from the corresponding portion of the section shown in Figure 1 in that no bushing is employed in Figure 6.

Referring to the drawings, it will be seen that the device comprises a main body portion 1 which has a base 2 provided with suitable holes 3 whereby it may be attached to the bed plate of a drill press or other suitable support. The body portion carries the vertically reciprocable plunger 4 which has a transverse slot 5 therethrough. It also carries the horizontal rock shaft 6 which is provided with an eccentric portion 7 that fits within the transverse slot 5 of the plunger 4. A keyway 8 is provided and the plunger 4 carries a key 9 which fits within the keyway and prevents turning of the plunger.

The handle 10 provided with a manipulating knob 11 is removably secured within a transverse opening through the shaft 6 by means of the set screw 12 or in any other suitable manner. Also it is to be noted from Figure 1 that axial shifting of the shaft 6 is prevented by means of the screw 13 which is carried by the body portion and which projects into the annular slot or groove 14 cut in the shaft 6.

A stop in the form of an elongated screw 15 is threaded through the upper part of the body portion and is provided with a knurled and apertured manipulating head 16 at its rear end and with a lock nut similarly knurled and apertured as indicated at 17 so that the adjustable stop and lock nut may be manipulated by a suitable instrument, such as a spanner wrench or rod.

A head portion 18 is secured to the upper part of the body portion and is preferably seated within a slot 19 extending transversely across the top of the body portion and is locked in place by a plurality of screws or in any other suitable manner as indicated in Figure 3. The head 18 is provided with a hole vertically therethrough which receives a fitting 20 which may be rotated in any position as shown by a comparison of Figures 1 and 5. This fitting has its shank portion locked by means of a set screw 21 and is itself apertured and adapted to receive a drill guide with or without a bushing. For example, drill guide 22 has a relatively small shank and a bushing 23 is provided. If desired, the bushing may be dispensed with and the drill guide as indicated at 22' in Figure 6 may be provided with a large enough shank to be directly received within the aperture through the fitting 20.

The fitting 20 is in reality a work positioning member and provided with a downwardly opening V-shaped notch 24, see Figures 1 and 2, a fitting with such a type of notch being suitable for drilling round stock. If desired, fittings with other types of notches may be employed for holding special work.

The drill guide 22 is held in place by means of a locking member 25 which is secured within a slot portion 26 of the head 18 of the device. It is held in place by means of a screw 27. It is to be noted that the screw 27 does not pass centrally through the locking member 25. This permits the screw to be retracted and the locking member turned end for end as shown in Figure 6 to lock a relatively larger drill guide in place when required.

A shoulder stop member 28 is provided and is carried by means of a pair of rigidly attached rods 29, see Figures 1 and 5. One or both of these guide rods 29 may be locked by means of a set screw 30, see Figures 2 and 5.

It is preferable to notch the shoulder stop 28 in the same manner as the notch 24 formed in the work positioning member 20. It is also preferable to provide a groove 31 at the upper vertex of the notch 24.

From an examination of Figure 1 it is apparent that the work positioning member 29 is provided with a shoulder that bears against the underside of the head 18. It is also apparent that the work positioning member 20 may be turned about a vertical axis to any angular position desired and that the shoulder stop 28 will be carried as a unit with the work positioning member 20. It may be found desirable when operating upon relatively long members to provide some form of support or rest for such members and this is furnished by any suitable means, as by means of the transversely extending rod 32 which projects through the body portion of the device.

The work positioning members include not only the work positioning member 20 but also the anvil member 33. This anvil member may take any suitable shape. It is preferably provided with a relatively flat and narrow upper surface and with tapered side portions. This anvil member 33 is formed integrally with a cylindrical portion 34 which is provided with a flange over which the overhanging lips of the clamping nut 35 are positioned, as shown in Figure 1. The clamping nut 35 is threaded on an adjustable extension 36 of the plunger 4. Preferably the adjustable extension 36 is screw threaded into the plunger and is provided with an integral head or manipulating portion 37 and with a lock nut 38. Thus it is possible, after loosening the lock nut 38, to raise or lower the extension 36 with reference to the plunger 4 by rotating the head 37. Thereafter the lock nut 38 is tightened to thus lock the extension in its adjusted position. The extension 36 and the plunger 4, therefore, form together an adjustable and extensible plunger.

The anvil or clamping member 33 may be turned at any angle desired to suitably clamp the work indicated by dot and dash lines and may thereafter be locked in position by means of the lock nut 35.

It is preferable to knurl the lock nuts 35 and 38 and the head 37 and they may be provided with apertures for the reception of spanner wrenches, rods, or other suitable tools.

In using the device, for example in drilling work which is cylindrical and provided with a shoulder, such work being indicated in Figure 1 by the reference character 39, the operator adjusts the shoulder stop 28 and thereafter positions the work beneath the work positioning member 20 and within the V-shaped notch 24 thereof. Thereafter he rocks the handle 10 downwardly, thus raising the extensible plunger and causing the anvil or clamping member 33 to clamp the work securely in place in the V-shaped notch. Thereafter the drill is caused to enter the aperture through the drill guide 22. The work may be readily removed by rocking the handle 10 upwardly to releasing position.

It is apparent that the height of the anvil with reference to the plunger 4 may be adjusted for different diameters of work. One of the important features of the invention is that chips which are produced by the drilling will not prevent accurate positioning of the work as the V-shaped block or positioning member 20 has its V-shaped opening extending downwardly so that the chips drop away from this positioning member which determines the correct positioning of the work. The operator, therefore, does not have to stop and clearaway the chips after each operation as all of the chips drop away from the positioning member 20. Even if chips should collect on the extreme flat top portion of the anvil 33, no harm will be done with reference to the correct positioning of the work as the work is positioned by means of the work positioning member 20 and the shoulder stop 28 or the rear back stop 15.

If it is desired to use the rear back stop, such stop is readily adjusted and then locked in place so that the hole is drilled with reference to the end of the piece being operated upon, whereas as shown in Figure 1 the hole is to be drilled with reference to the shoulder of the work. Either stop may be used.

Additionally, for certain types of work it is desirable to set the work positioning member and shoulder stop 20 and 28 respectively at an angle. This may be readily done, as shown in Figure 5, and thereafter the parts may be locked in place by means of the set screw 21, see Figures 1 and 2.

It is also apparent that if desired the work particularly if it is relatively long may be temporarily rested upon the rod 32, which obviously may be made as long as desired.

It is preferable to so arrange the height of the anvil 33 with reference to the main plunger 4 that the operating handle 10 may be rocked downwardly to a position where it just slightly passes dead center to thereby securely lock the work in place at each operation. It is apparent that where a large number of identical pieces have to be drilled, that they may be drilled with a great rapidity and with the assurance that the drilled hole will bear the correct spacing from the reference point whether it be the shoulder or the end of the work piece.

Obviously the device may be operated very rapidly to successively clamp and release the work as the pieces are positioned or removed and with the absolute assurance that extreme accuracy will be maintained irrespective of chips or other matter that ordinarily prevents accurate work of this type.

It is to be understood that the machine is furnished with a plurality of drill guides 22 or 22' to receive different sizes of drills and to accurately guide the drill through a material length of the drill itself to thus insure the correct positioning of the drill, such drill being guided down to a point closely adjacent the work. When relatively large drills are employed, the bushing 23, see Figure 1, is dispensed with as the shank of the drill guide, such as indicated at 22' in Figure 6, will necessarily be large enough to completely fill the opening in the work positioning member 20. Where small drills are employed, it may be desirable to have a relatively small shank on the drill guide, such as the type of drill guide indicated at 22 in Figure 1, and this small shank is supplemented by the bushing 23 so as to accurately fill the opening in the work positioning member 20.

It is also to be understood that interchangeable clamping members or anvils may be employed to suitably engage the under side of work of different shapes.

It is to be noted also that the apparatus can be adjusted for either a right or left-hand operator as the operating handle 10 may extend into the shaft 6 from either side thereof, depending upon which way is most convenient for the operator to rock the handle.

It is preferable to so proportion the parts that when the lock nut 38 is clamped tightly against the top of the plunger 4, such lock nut will act as a stop contacting the body portion 1 and thus limit the downward motion of the plunger 4 and also limit the upward rocking motion of the handle 10 since the handle 10 rocks upwardly on downward motion of the plunger. In this way the handle 10 is stopped in its up stroke at a point where it is not in engagement with the back stop screw member 15.

It will be seen that a very simple and serviceable drill jig has been provided which may be very rapidly operated to clamp the work in its accurately positioned location with reference to the drill guide either through the medium of a back stop or through the medium of a shoulder stop both of which are adjustable, and in which no inaccuracy will result due to the accumulation of chips in the continuous operation of the apparatus, and in which an operator is not required to remove the chips between each successive operation in order to secure this accuracy.

Although this invention has been described in considerable detail, it is to be understood that such description is intended as illustrative rather than limiting, as the invention may be variously embodied and is to be interpreted as claimed.

I claim:

1. A drill jig comprising a body portion having an overhanging upper part provided with means for the reception of a plurality of interchangeable drill guiding bushings, means for clamping a drill guiding bushing to said overhanging portion, a work positioning member carried by said overhanging portion and having a work engaging surface directed downwardly, whereby chips from drilling will not collect on said work engaging surface, reciprocable clamping means for engaging the under portion of the work and holding the work clamped to the under surface of said work positioning member, said work positioning member including means for positively positioning the work and preventing lateral shifting of the work, means for moving said clamping means into and out of clamping engagement with the under side of the work, and separate means for adjusting the initial position of said clamping means to accommodate work of different sizes.

2. A drill jig comprising a body portion having an overhanging upper portion, drill guiding means carried by said overhanging portion, a work engaging member mounted for angular adjustment about the axis of said drill guiding means, said work positioning member having a downwardly directed surface against which the work is adapted to bear, said surface being so arranged that chips from drilling will fall away from said surface and will not collect thereon, and a clamping member mounted below said work engaging surface for vertical reciprocation into and out of clamping engagement with the under side of said work, and eccentric means for reciprocating said clamping member, said clamping member and eccentric means being relatively adjustable, whereby said clamping member may be arranged to clamp the work when the eccentric means is slightly past dead center.

3. A drill jig comprising a body portion having an overhanging upper part, drill guiding means carried by said overhanging upper part, a work positioning member carried by said upper part and having a downwardly directed work positioning surface, whereby chips from drilling will not collect on said work positioning surface, a plunger member slidably carried for vertical reciprocation by said body portion and located below the work positioning member and being keyed to said body portion to prevent rotary motion of said plunger, said plunger having telescopic screw threaded portions for adjusting the total length of said plunger, means for locking said telescopic screw threaded parts of said plunger in adjusted position, a work engaging clamping member carried by the upper part of said plunger, and a clamping lever operatively coupled to said plunger for reciprocating said plunger upwardly to clamp the work against the under side of said work positioning member.

4. A drill jig comprising a body portion having an overhanging upper part provided with an aperture therethrough, work positioning means revolubly mounted in said aperture, means for locking said work positioning means in adjusted position, said work positioning means having an aperture therethrough for the interchangeable reception of a plurality of drill guiding bushings, stop means adjustably carried by said work positioning means for engaging a part of the work, said work positioning means having a work engaging surface directed downwardly, whereby chips from drilling will not collect on said work positioning surface, a vertically reciprocable plunger carried by said body portion and mounted below said work positioning means, said plunger comprising two threaded telescopic parts, whereby the total length of said plunger may be adjusted, said plunger being slidably keyed to said body portion, a work clamping member carried by said plunger adjacent the upper end thereof and adjustable about the axis of said plunger, means for locking said work clamping member to said plunger, and means for reciprocating said plunger.

HARRY NELS CHRISTENSON.